United States Patent
Kiest, Jr.

(10) Patent No.: US 7,426,941 B2
(45) Date of Patent: *Sep. 23, 2008

(54) APPARATUS AND METHOD FOR LATERAL PIPE IDENTIFICATION

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/831,646

(22) Filed: Jul. 31, 2007

(65) Prior Publication Data

US 2008/0016952 A1    Jan. 24, 2008

Related U.S. Application Data

(63) Continuation of application No. 11/098,075, filed on Apr. 4, 2005, now Pat. No. 7,306,011.

(51) Int. Cl.
*F16L 55/16* (2006.01)

(52) U.S. Cl. .................. 138/98; 138/97; 138/104; 405/150.1; 405/184.2; 156/287; 264/267; 264/516

(58) Field of Classification Search .............. 138/98, 138/104, 97; 405/150.1, 184.1, 184.2; 156/287; 264/267, 269, 516

See application file for complete search history.

(56) References Cited

U.S. PATENT DOCUMENTS

| 4,982,490 | A | 1/1991 | Franklin | 29/890.14 |
|---|---|---|---|---|
| 5,577,864 | A | 11/1996 | Wood | 405/184.2 |
| 5,927,341 | A | 7/1999 | Taylor | 138/98 |
| 5,944,058 | A | 8/1999 | Kamiyama et al. | 138/98 |
| 5,950,682 | A | 9/1999 | Kiest, Jr. | 138/98 |
| 6,068,725 | A | 5/2000 | Tweedie | 156/287 |
| 6,123,109 | A | 9/2000 | Kamiyama et al. | 138/98 |
| 6,427,726 | B1 | 8/2002 | Kiest, Jr. | 156/94 |

FOREIGN PATENT DOCUMENTS

| EP | 0891857 A2 | 1/1999 |
|---|---|---|
| EP | 0978681 A1 | 2/2000 |

OTHER PUBLICATIONS

LMK Enterprises, Inc., International Search Report, PCT/US2006/006864 filed Feb. 27, 2006.

*Primary Examiner*—Patrick F Brinson
(74) *Attorney, Agent, or Firm*—McKee, Voorhees & Sease, P.L.C.

(57) ABSTRACT

The method for identifying lateral pipes includes printing identifying indicia on the interior surface of a liner assembly positioned adjacent the lateral pipe. The apparatus includes the liner assembly in place with the identifying indicia visible from the interior of the pipe line.

11 Claims, 3 Drawing Sheets

APPARATUS AND METHOD FOR LATERAL PIPE IDENTIFICATION

CROSS-REFERENCE TO RELATED APPLICATIONS

This application is a Continuation of U.S. Ser. No. 11/098,075 filed Apr. 4, 2005, herein incorporated by reference in its entirety.

BACKGROUND OF THE INVENTION

The present invention relates to an apparatus and method for lateral pipe identification.

In the repair of pipe lines, a TV camera is moved through the main line pipe to the place to be repaired. Often these repairs are needed at junctions between the main line pipe and the lateral pipes coming from each house.

Identification from the inside of the main line pipe is very difficult. Many laterals have multiple bends, and it is difficult to identify which lateral junction relates to which house or lateral pipe.

Therefore, a primary object of the present invention is the provision of an improved apparatus and method for lateral pipe identification.

A further object of the present invention is the provision of an apparatus and method for lateral pipe identification which permits a camera within the main line pipe to photograph the identification indicia for each lateral pipe.

A further object of the present invention is the provision of an apparatus and method for lateral pipe identification which can be easily visible from the interior of the main line pipe.

A further object of the present invention is the provision of an apparatus and method for lateral pipe identification which is simple, economical, and easy to install.

SUMMARY OF THE INVENTION

The foregoing objects may be achieved by an apparatus and a method for identifying a plurality of lateral pipes, each of which form a junction with a main pipe. The method comprises taking a main and lateral liner assembly having an interior surface and an exterior surface and being comprised of material that can be impregnated with a liquid that is capable of curing and hardening. The interior surface of the liner assembly is marked with identifying indicia corresponding to one of the junctions of one of the lateral sewer pipes with the main sewer pipe. The liner assembly is then moved within the main sewer pipe with the exterior surface of the liner assembly facing the main sewer pipe. The liner assembly is positioned within the main sewer pipe so that the identifying indicia corresponding to the one junction of the lateral sewer pipe with the main sewer pipe is adjacent the one junction.

According to another feature of the present invention, a camera is moved within the main sewer pipe adjacent the identifying indicia and is used to view the identifying indicia and transmit the identifying indicia to a position above ground where the identifying indicia can be read.

According to another feature of the present invention, the interior surface of the line assembly is marked with a plurality of spaced apart indicia. Each of the plurality of indicia correspond to a different one of the plurality of junctions. The liner assembly is moved within the main sewer pipe to a position wherein each of the plurality of spaced apart indicia is positioned adjacent one of the plurality of junctions corresponding thereto.

According to another feature of the present invention, the liner assembly includes a main liner and the method comprises moving the main liner within the main sewer pipe to a position adjacent the junction of the lateral sewer pipe to the main sewer pipe.

According to another feature of the present invention, the method comprises inverting the main liner during the moving step or pulling the main liner in place.

According to another feature of the present invention, the liner assembly is T or Y shaped, and includes a main liner and a lateral liner. The method comprises moving the lateral liner within one of the later sewer pipes and moving the main liner within the main sewer pipe.

The apparatus of the present invention comprises a liner assembly within the main sewer pipe. The liner assembly includes an exterior surface that faces the main sewer pipe and an interior surface that faces in an inner radial direction. The liner assembly is impregnated with a cured hardened material that imparts rigidity to the liner assembly. The interior surface of the liner assembly forms a hollow bore within the main pipe line. Identifying indicia are on the interior surface of the liner assembly corresponding to the lateral sewer pipe. The identifying indicia are visible from inside the hollow bore of the liner assembly.

According to another feature of the present invention, the apparatus comprises a liner assembly having a lateral liner within the lateral sewer pipe and a main liner within the main sewer pipe.

DETAILED DESCRIPTION OF THE PREFERRED EMBODIMENT

Figure 1:
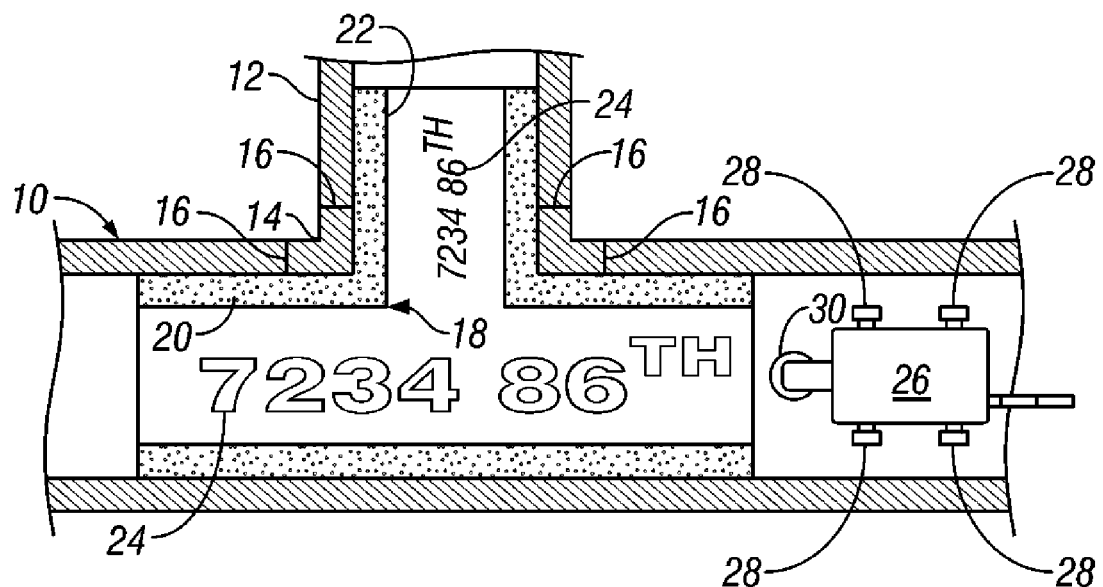
FIG. 1 is a sectional view showing the liner assembly in place with the identifying indicia thereon.

Referring to FIG. 1, the completed identification system of the present invention is shown. FIG. 1 shows a main pipe 10 and a lateral pipe 12 which are joined together at a junction 14. The numeral 16 refers to damaged cracks in the lateral pipe 12 and the main pipe 10 adjacent junction 14. This is a very common occurrence of failure and results in the damaged cracks 16 at the junction 14.

The numeral 18 refers to a T-shaped or Y-shaped liner assembly comprising a main liner 20 and a lateral liner 22. As can be seen in FIG. 1, the lateral liner 22 extends within the lateral pipe 12 and the main liner 20 remains within the main line pipe 10. The liner assembly may be T-shaped as shown in FIG. 1 or may be Y-shaped to accommodate a lateral line 12 which joins the main line 10 at an oblique angle. The main liner assembly 18 is made of a material which can be impregnated with a curable hardened fluid. Usually this fluid is a resiness material which impregnates the liner assembly 18. Preferably the liner assembly 18 is made from felt, but other materials can be used which absorb the fluid before it cures and hardens. In FIG. 1, the fluid is shown in an already cured and hardened position so as to hold the liner assembly 18 in the position shown in FIG. 1.

Identifying indicia 24 are printed on the interior surface of the main liner 20. While it is preferably that these identifying indicia 24 be placed in the main liner, it is also possible that they could be placed within the interior surface of the lateral liner 22, but preferably they should be visible from the main line 10. The identifying indicia 24 may be the address of the house from which the lateral line 12 extends, or could be other identifying indicia.

The numeral 26 refers to a mobile camera 26 having wheels 28 which engage the interior walls of main pipe line 10. Camera 26 includes a lens 30 which may be rotated so as to view the identifying indicia 24. A cable 32 is connected to the camera 26. Robotic cameras 26 are commonly used in the repair of pipe lines. Thus it is possible to by virtue of the lens 30 to view the identifying indicia 24 and determine which lateral liner 12 is being repaired. This is an important ability in the repair of lateral pipe lines because it is difficult from the interior of the main pipe 10 to ascertain which particular lateral liner 12 is joined with the main liner 10. Use of the identifying indicia 24 facilitates this identification.

Figure 2:
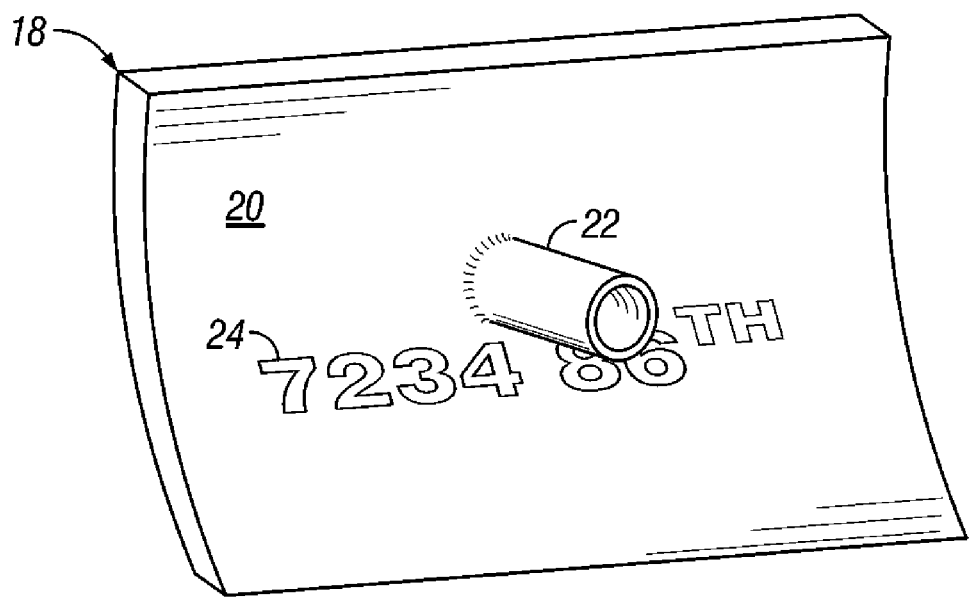
FIG. 2 is a perspective view of the liner assembly utilized in FIG. 1, prior to installation.

FIG. 2 shows the liner assembly 18 during the assembling process. The lateral liner 22 is joined to the main liner 20, and the main liner 20 is wrapped into a cylindrical configuration similar to that shown in FIG. 3. The identifying indicia 24 are provided on the interior surface of the main liner 20.

Figure 3:
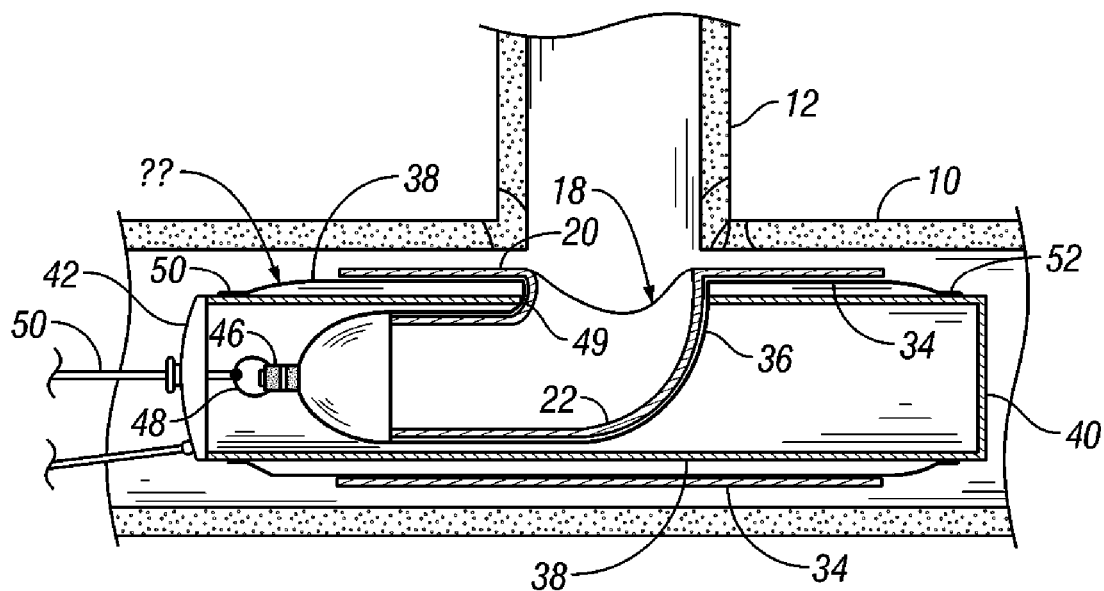
FIG. 3 is a sectional view similar to FIG. 1, and showing the liner assembly during installation.
Figure 4:
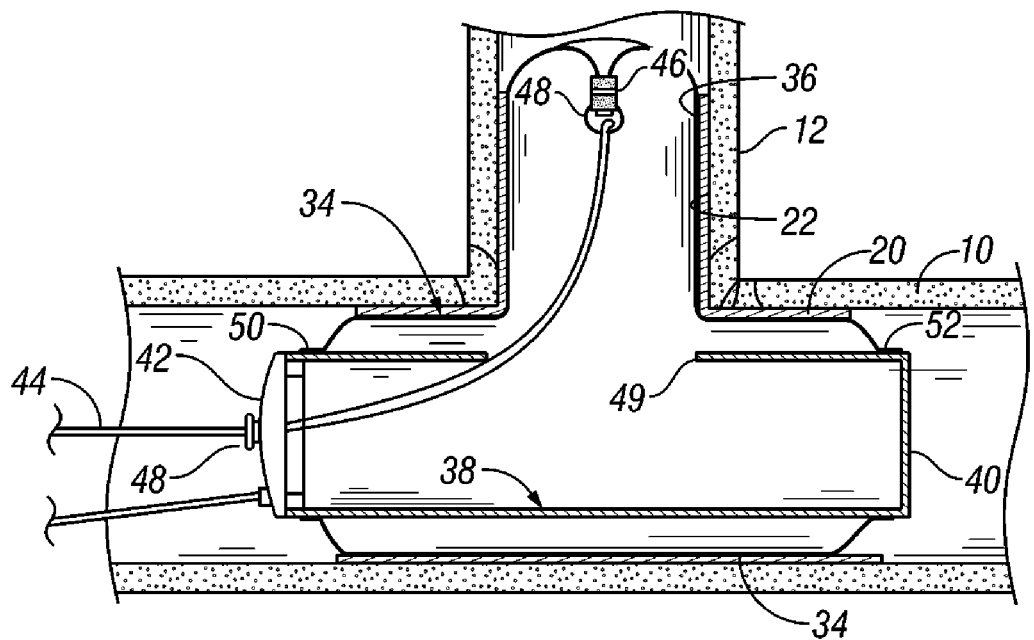
FIG. 4 is a sectional view similar to FIG. 3, and showing a further stage of the assembly.

Referring to FIG. 3, a carrier canister 38 is shown. This carrier canister includes a closed end 40 and a cap 42 at the other end. A cable 44 extends through the cap 42 and is connected to a loop 48 which is connected to a bladder tube plug 46 closing the end of a lateral bladder 36. The lateral bladder 36 is connected to a main bladder 34 which extends outwardly through an opening 49 and which is attached to the outer surface of canister 38 at 50 and 52 and which is sealed to the outer surface of canister 38 at 50 and 52. The lateral liner 22 is within the canister 38 and is also within the lateral bladder 36. The main bladder 34 is outside the canister 38. The main liner 20 is outside the main bladder 34. Air is introduced to the interior of canister 38, and this air causes the lateral bladder 36 to invert outwardly from the position shown in FIG. 3 to the position shown in FIG. 4 into the lateral pipe 12. Similarly, the lateral liner 22 is inverted outwardly into the lateral line 12 and the exterior surface of the lateral liner 22 faces the lateral pipe 12. The air pressure within canister 38 also urges the main bladder 34 and the lateral bladder 36 outward in a radial direction so as to press the lateral liner 22 against the lateral pipe 12 and the main liner 20 against the main pipe 10.

After the resin or other fluid material cures and hardens, the bladders 34, 36 are removed and the canister 38 is also removed to leave the liner assembly 18 in the position shown in FIG. 1.

Figure 5:
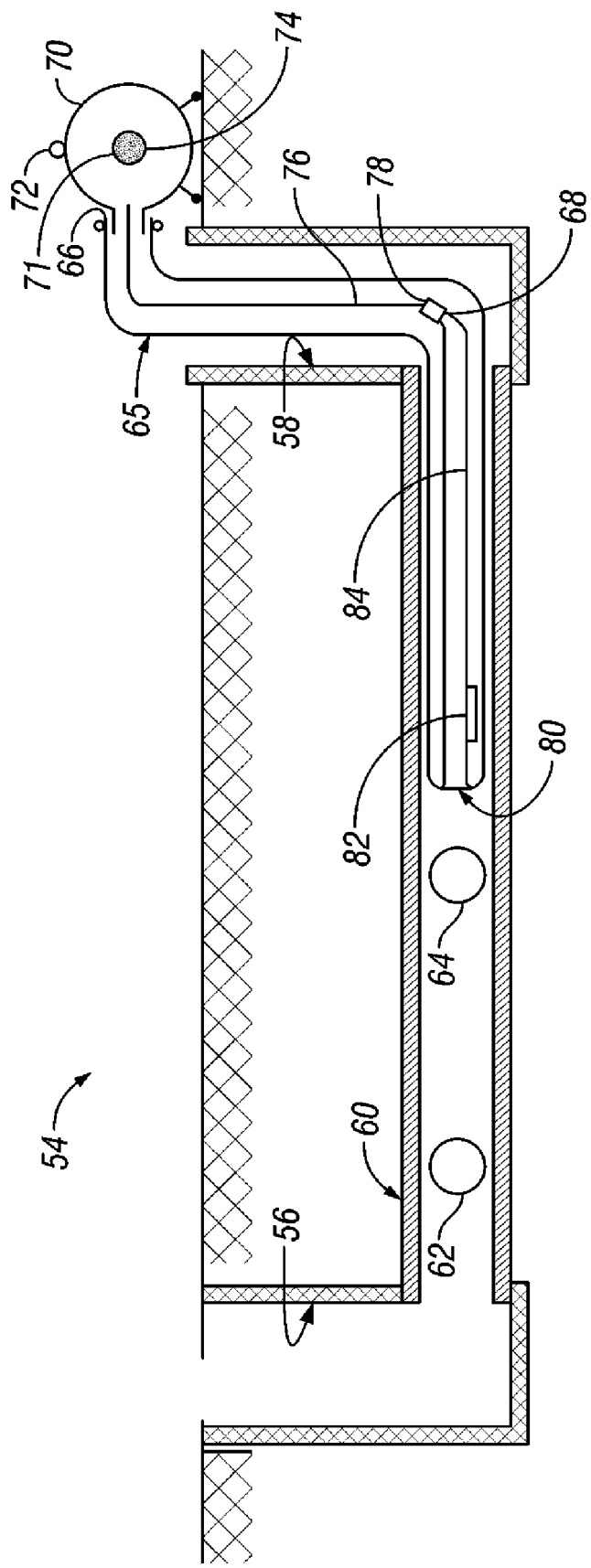
FIG. 5 is a sectional view of a modified form of the present invention.

FIG. 5 shows a sectional view of an alternative form of the present invention. This alternative modified form is indicated by the numeral 54. Shown in FIG. 5 is a first manhole 56 and a second manhole 58 which are joined by a main sewer pipe 60. A first lateral sewer pipe 62 joins the main sewer pipe 60 and a second lateral sewer pipe 64 also joins the main sewer pipe 60. A liner assembly 65 includes a first liner assembly 66 and a second liner assembly 68. A container 70 includes an outlet 71 to which is connected the first end 66 of the liner assembly 65. The container 70 also includes an air hose 72 which is adapted to inject air into the interior of container 70. A cable axle 74 is provided in the center of container 70 and includes a cable 76 wound there around and extending downwardly to be connected to plug 78 which closes the second end 68 of liner assembly 65. By the injection of air into container 70 through air hose 72, it is possible to cause the liner assembly 65 to invert outwardly into the main sewer pipe 60. The inversion face 80 represents the forward end of the inverting liner assembly 65.

Shown schematically on the interior surface of the liner assembly 65 are a first identifying indicia 82 and a second identifying indicia 84. These identifying indicia 82, 84 invert outwardly so as to be on the interior surface of the liner assembly 65 after they are inverted. Identifying indicia are positioned so as to be aligned with and correspond to the first lateral sewer pipe 62 and the second lateral sewer pipe 64 respectively.

It is usually necessary to cut openings in the main liner assembly 65 adjacent the entry points of first lateral liner 62 and second lateral liner 64. However, the identifying indicia 82, 84 are positioned so as to continue to identify the locations of the first lateral liner 62 and the second lateral liner 64 respectively. Thus it is possibly by means of a camera such as shown in FIG. 1 to identify the particular lateral pipe which is being encountered.

The present invention contemplates numerous variations, options, and alternatives. For example, a main liner with markings can be installed and then a lateral liner can later be installed. Alternatively, there need not be a main liner, but only a lateral liner with markings where the markings in the lateral liner can be viewed from the main or from the lateral. The present invention provides for either inverting a main liner or pulling-in-place. The present invention provides for using a deformed plastic pipe and reforming it, using a stainless steel pipe, or using another alternative to a liner assembly being impregnated with a cured hardened material to impart rigidity. These and other variations, options, and alternatives are well within the spirit and scope of the invention.

What is claimed is:

1. An apparatus for lining at least a portion of a lateral sewer pipe that joins a main sewer pipe and for uniquely identifying the lateral sewer pipe from other lateral sewer pipes that join the main sewer pipe, the apparatus comprising:

a lining tube having a first end and an opposite second end and adapted to conform to the interior surface of the lateral sewer pipe with an exterior surface of the lining tube facing the lateral sewer pipe and an interior surface of the lining tube facing an inner radial direction;

wherein the lining tube includes a printed identifying indicia viewable from within the lateral sewer pipe, the printed identifying indicia corresponding to the lateral sewer pipe.

2. The apparatus of claim 1 wherein the lining tube is made of a resin absorbable flexible material.

3. The apparatus of claim 2 wherein at least a portion of the lining tube is impregnated with a resinous material capable of curing and hardening that imparts rigidity to the lining tube.

4. The apparatus of claim 1 wherein the printed identifying indicia is a street address.

5. The apparatus of claim 1 wherein the printed identifying indicia is on an interior surface of the tube near one of the first and second ends.

6. A method for identifying each of a plurality of lateral sewer pipes connected to a main sewer pipe at a plurality of junctions, the method comprising:

providing a lining assembly having a main sewer pipe lining with an interior surface facing outwardly and an exterior surface facing inwardly;

printing a plurality of identifying indicia corresponding to the plurality of lateral sewer pipes on the interior surface of the main sewer pipe lining;

moving the liner assembly within the main sewer pipe;

everting the liner assembly so that the exterior surface of the main sewer pipe lining is exterior to the main sewer pipe lining and the interior surface of the main sewer pipe lining is interior of the main sewer pipe with the identifying indicia positioned near the corresponding lateral sewer pipes.

7. The method of claim 6 further comprising:

moving a camera within the main sewer pipe and the liner assembly adjacent one of the plurality of identifying indicia;

using the camera to photograph the one of the plurality of identifying indicia; and identifying the one of the plurality of junctions by the identifying indicia on the interior of the liner assembly.

8. A method for identifying a lateral sewer pipe that forms a pipe junction with a main sewer pipe comprising:

providing a liner assembly having an interior surface and an exterior surface;

marking the interior surface of the liner assembly with printed identifying indicia corresponding to the lateral sewer pipe;

moving the liner assembly within the main sewer pipe with the exterior surface of the liner assembly facing the main sewer pipe; and positioning the liner assembly within the main sewer pipe so that the printed identifying indicia corresponding to the lateral sewer pipe is adjacent the pipe junction.

9. The method of claim 8 wherein the liner assembly is made of a resin absorbable flexible material.

10. The method of claim 9 further comprising impregnating the liner assembly with a resinous material capable of curing and hardening that imparts rigidity to the liner assembly.

11. The apparatus of claim 5 wherein the printed identifying indicia is viewable from within the main sewer pipe.

* * * * *